United States Patent [19]

Wiederkehr

[11] 4,106,205

[45] Aug. 15, 1978

[54] APPARATUS FOR MEASURING INSIDE AND OUTSIDE CHAMFERS ON WORKPIECES

[76] Inventor: Hans Wiederkehr, Ifangstrasse 107, Rumlang, Switzerland

[21] Appl. No.: 692,437

[22] Filed: Jun. 3, 1976

[30] Foreign Application Priority Data

Jun. 13, 1975 [CH] Switzerland ............... 7698/75

[51] Int. Cl.² .............................................. G01B 3/56
[52] U.S. Cl. .................................. 33/174 E; 33/143 J
[58] Field of Search ............ 33/174 E, 178 R, 143 J, 33/167

[56] References Cited

U.S. PATENT DOCUMENTS

| 1,506,618 | 8/1924 | Durham | 33/143 M |
| 2,801,472 | 8/1957 | Davidiak et al. | 33/143 J |

*Primary Examiner*—Richard E. Aegerter
*Assistant Examiner*—Willis Little
*Attorney, Agent, or Firm*—Weingarten, Maxham & Schurgin

[57] ABSTRACT

Apparatus for measuring the angle and size of inside and outside chamfers. The apparatus comprises a body having a stop edge with a tongue displaceably mounted to the body, the tongue having a stop edge corresponding to the chamfer angle. Means are provided to releasably clamp the tongue in place with respect to the body.

5 Claims, 10 Drawing Figures

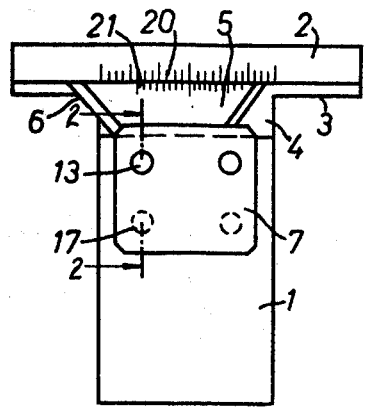
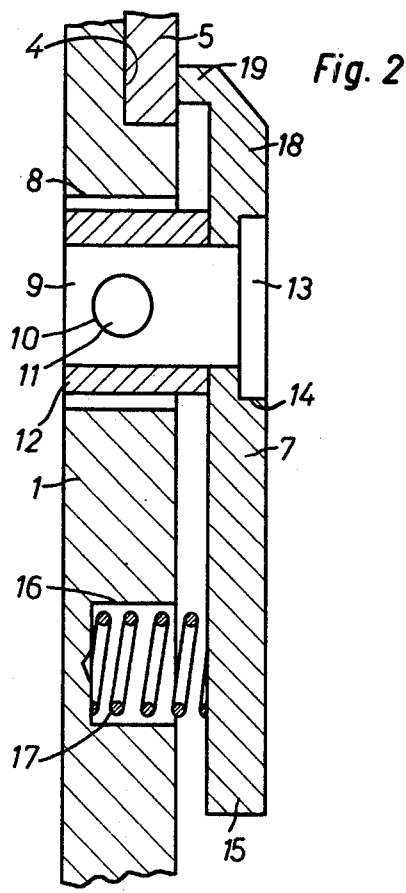
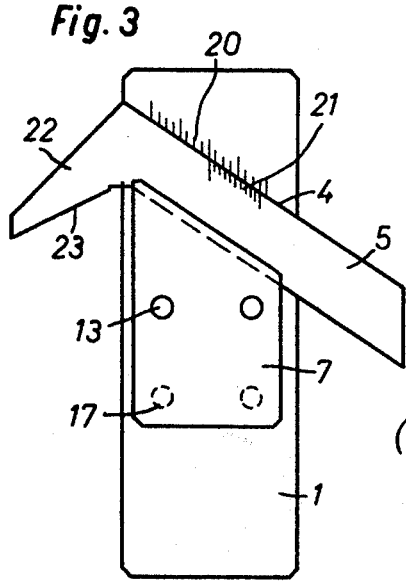
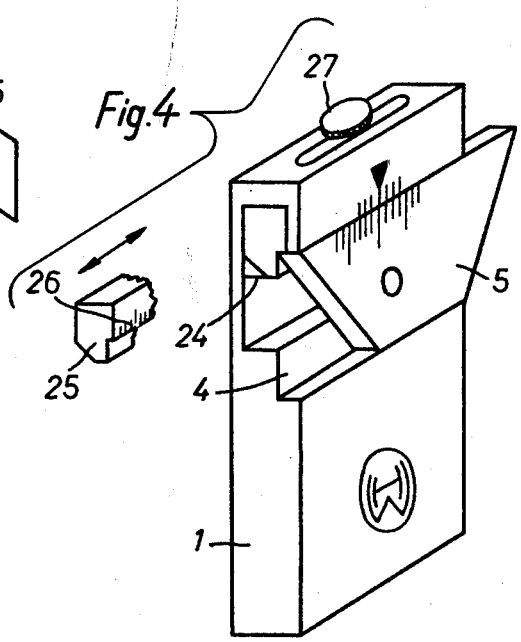

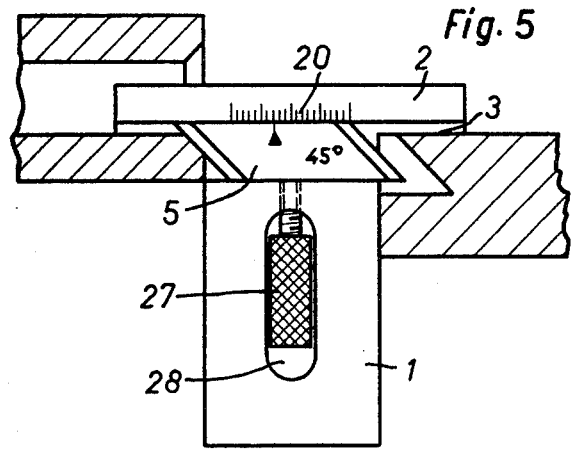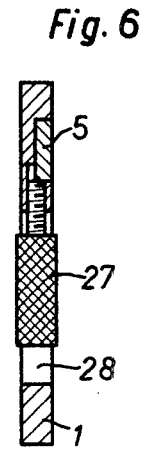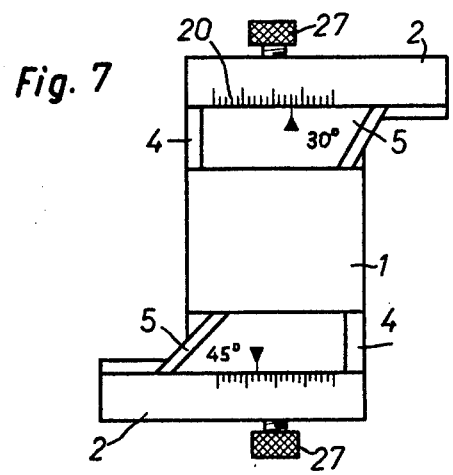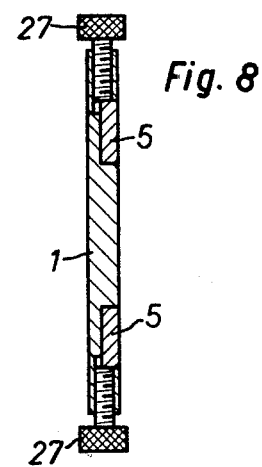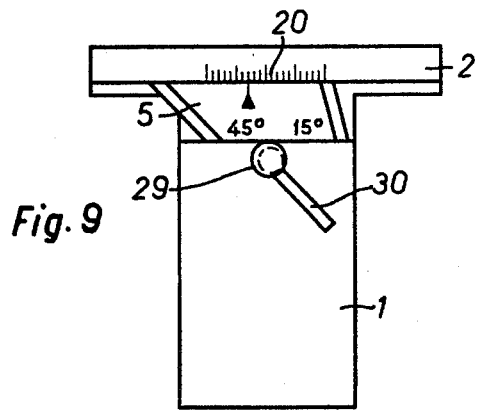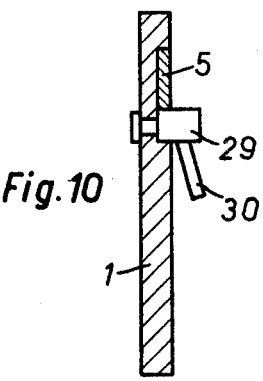

APPARATUS FOR MEASURING INSIDE AND OUTSIDE CHAMFERS ON WORKPIECES

FIELD OF THE INVENTION

The invention relates generally to measuring devices and more particularly to an apparatus for measuring inside and outside chamfers on workpieces with reference to their angle and size.

DISCUSSION OF THE PRIOR ART

It is known to use a goniometer or protractor for measuring chamfers. This known apparatus admittedly makes it possible to measure the angle of outside chamfers, but such devices have not previously been able to permit such a measurement of inside chamfers, such as chamfers on the periphery of holes. In general the protractor is also unable to measure difficulty accessible chamfers, such as dovetailed grooves.

SUMMARY OF THE INVENTION

The object of the invention is to provide an apparatus for measuring chamfers of random type on workpieces which cannot be measured with a protractor and for which, in addition, the chamfer size can be accurately measured. The invention provides an apparatus wherein a body is formed with at least one stop edge and a tongue displaceably mounted in a guide within the body. The free end of the tongue has a stop edge corresponding to the chamfer angle and the tongue is releasably clampable to the body.

BRIEF DESCRIPTION OF THE DRAWING

The objects, features and advantages of the present invention will be apparent from the following description when read in conjunction with the accompanying drawing in which:

FIG. 1 is an elevational view of a first embodiment of a goniometer constructed according to this invention;

FIG. 2 is an enlarged partial section through the apparatus of FIG. 1 taken along the line 2—2;

FIG. 3 is an elevational view similar to FIG. 1 of a further embodiment of a goniometer for measuring drill angles made in accordance with the invention;

FIG. 4 is a perspective view of a further embodiment of a goniometer of the present invention with a displaceable stop member;

FIGS. 5 and 6 present an elevational view and a cross-section respectively of a goniometer similar to FIG. 1, but with a stop screw for the measuring tongue arranged in the body;

FIGS. 7 and 8 also present an elevational view and a cross-section respectively of a further embodiment of a goniometer with outside stop screws for both tongues; and FIGS. 9 and 10 are elevational and cross-sectional views respectively of a goniometer similar to FIG. 1, but with a clamping eccentric for arresting the measuring tongue.

DETAILED DESCRIPTION OF THE PREFERRED EMBODIMENTS

The goniometer shown in FIG. 1 has a plate-shaped body 1, which at one end has arms 2 projecting laterally above the said body 1, whereby the edge 3 of arms 2 directed toward body 1 is constructed as a stop edge. Advantageously, edge 3 is constructed as a hair rule. A guidance slot 4, in which a measuring tongue 5 is displaceably guided, is arranged between body 1 and arms 2 and passes at right angles over the width of body 1. At each of its two free ends the measuring tongue 5 has a stop edge 6 corresponding to the angle of the chamfer to be measured. The stop edge 6 is also constructed as a hair rule and thus permits a precise check on the chamfer.

Measuring tongue 5 is releasably securable in the guidance slot by means of a clamping plate 7 mounted in swivellable manner in body 1. FIG. 2 shows the mounting of clamping plate 7 in body 1 on an enlarged scale. In body 1 are provided holes 8, two such holes being shown in FIG. 1, into which projects a bolt 9 with a transverse bore 10. Bore 10 receives a pin 11, the ends of which are mounted in body 1, thereby constituting the swivel axis for clamping plate 7. A bush 12 surrounds the bolt 9 and is also secured in place by pin 11 which passes therethrough. Bolt 9 has a head 13 located in a recess 14 of clamping plate 7. The clamping plate is secured onto bolt 9 by means of bolt head 13 and bush 12. Clamping plate 7 is constructed as a two-armed lever, whose one arm 15 is normally urged away from body 1 by the action compression spring 17 located in a recess 16 of body 1. The other arm 18 of the clamping plate is shorter than arm 15 and has an inwardly directed connecting strip 19 via which the plate is pressed onto measuring tongue 5 by spring 17, thereby preventing a displacement of the measuring tongue. FIG. 1 shows the two bolt heads 13, while the two compression springs 17 mounted beneath clamping plae 7 in recesses 16 are indicated by dotted circles. In place of the two bolts 9 it is also possible to use a single bolt or several bolts 9.

A measuring scale 20 is provided on arms 2, while the measuring tongue 5 has a vernier 21 thereon adapted to coact with scale 20 in normal fashion. The stop edges 6 can have a random inclination, such as 30°, 45° or 60°, depending on the type of chamfers to be measured.

FIG. 3 shows a second embodiment of a goniometer constructed in accordance with the principles of the present invention, intended especially for measuring drill angles. The structure of this apparatus is similar to that of FIG. 1 and comprises a body 1 in which a measuring tongue 5 is guided in an inclined guidance slot 4, one end of said tongue 5 having a roof-shaped extension 22. The roof-shaped extension 22 has a roof-shaped stop edge 23. Measuring tongue 5 is releasably secured to body 1 in slot 4 in the same way as in FIG. 1, that is, by a clamping plate 7, which is mounted in the manner shown in FIG. 2. By means of measuring scale 20 and vernier 21, it is possible, for example, to establish whether or not a drill has been perfectly centrally ground. The stop edge 23 shows the drill angle to be tested and can also be constructed as a hair rule, so that by forming a light slip the precise outline of the drill bit can be established. Note that the apparatus of FIG. 3 does not have arms 2 of the FIG. 1 embodiment.

FIG. 4 shows a further embodiment of the present goniometer. The body 1 has measuring tongue 5 which is displaceably guided in guidance slot 4. A stop member 25 with a measuring scale 26 is displaceably mounted in a recess 24. The displaceable stop member 25 has the same function as arm 2 in the embodiment of FIG. 1. The advantage of this embodiment is that by means of the displaceable stop member 25, chamfers in the area of a narrow gap, for example, between two flanges, can be measured, whereby simultaneously the depth can be measured with measuring scale 26. Measuring tongue 5 can be arrested by means of an outer stop screw 27 operating in normal fashion to engage the measuring tongue, while an arresting mechanism (not shown) can be provided on the back of body 1 for the adjustable stop member 25. Such latter arresting mechanism may be similar to any of those shown herein or of conventional type.

FIGS. 5 and 6 show an embodiment of the goniometer similar to that of FIG. 1. A knurled stop screw 27 is provided in a recess 28 of body 1 and serves to arrest the measuring tongue 5. The left hand side of FIG. 5 represents the measuring of a bevel and the right hand side the measuring of a dovetailed groove. The stop edges are hereby located on planar or cylindrical surfaces, whereby displacing the measuring tongue 5 the angle of the bevel and the size thereof can be measured.

In the embodiment of FIGS. 7 and 8, the body 1 has on each of the opposite ends a stop arm 2 and a guidance slot 4 with a corresponding measuring tongue 5. The measuring tongues 5 can be arrested by means of an outer knurled stop screw 27.

The difference between the embodiment of FIGS. 9 and 10 compared with that of FIG. 1 is that in place of clamping plate 7, a clamping eccentric 29 is provided in body 1 for arresting the measuring tongue 5 and tension is applied thereto or relieved therefrom by means of a driving arm 30.

Further embodiments of the described goniometer are possible and in particular the measuring tongue can be constructed for different angles. Furthermore, measuring scale 20 can be adapted to the measuring precision requirement. Measuring tongues 5 can also be inserted in the reversed position, that is, rotated 180° end-for-end, thereby providing further measuring possibilities.

The invention is not limited to the embodiments described and represented hereinbefore and various modifications can be made thereto by those skilled in the art which are within the scope of the invention.

What is claimed is:

1. An apparatus for measuring inside and outside chamfers on workpieces, said apparatus comprising:
    a substantially flat rectangular body having a first stop edge along one side thereof and at least one guide slot formed in said body and opening into said first stop edge;
    a measuring tongue having a single second stop edge on one end thereof slideably mounted within said guide slot with said second stop edge arranged to protrude through said first stop edge a distance depending upon the position of said measuring tongue in said guide slot, said second stop edge being inclined with respect to the direction of motion of said tongue in said guide slot to also form an angle with said first stop edge generally corresponding to the angle of the chamfer to be measured;
    means for releasably securing said measuring tongue to said body within said guide slot; and
    an arm extending outwardly from said one side of said body forming an angle of substantially 90° with said first stop edge where, by movement of said tongue, said second stop edge forms an angle between both said arm and said first stop edge, said arm being formed with a third stop edge defining one side of the angle between said arm and said first stop edge on said body.

2. The apparatus according to claim 1 wherein said releasably securing means comprises:
    a clamping plate;
    means for swivellably coupling said clamping plate to said one face of said body; and
    a spring mounted between said body and one end of said clamping plate, said swivel means being located between said spring and the other end of said clamping plate normally bearing against said measuring tongue;
    whereby said spring normally urges said other end of said clamping plate against said measuring tongue to frictionally retain it in a desired position in said guide slot.

3. The apparatus according to claim 1 wherein said releasably securing means comprises a clamping screw threadably mounted in said body, one end of said screw being adapted to engage a surface of said measuring tongue to secure said tongue in a desired position.

4. The apparatus according to claim 1 wherein said releasably securing means comprises:
    an eccentric sleeve rotatably mounted to said body adjacent said measuring tongue; and
    a driving arm secured to said eccentric sleeve;
    said eccentric sleeve, by means of said driving arm, being rotatable to selectively engage and disengage said measuring tongue to respectively secure and release said tongue with respect to said body.

5. The apparatus of claim 1 wherein:
    said arm is slideable with respect to said body in a direction substantially parallel to said tongue and orthogonal with respect to said first stop edge;
    said arm being formed with a third stop edge on one end thereof facing away from and parallel to said first stop edge and being substantially orthogonal to the direction of arm motion.

* * * * *